J. C. MOORE.
Odorless Garbage Receivers.
No. 199,734.  Patented Jan. 29, 1878.
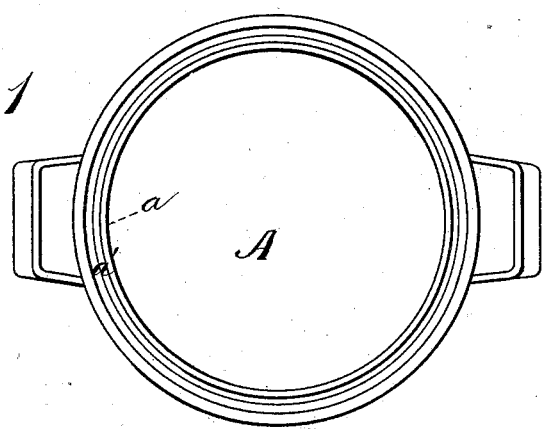
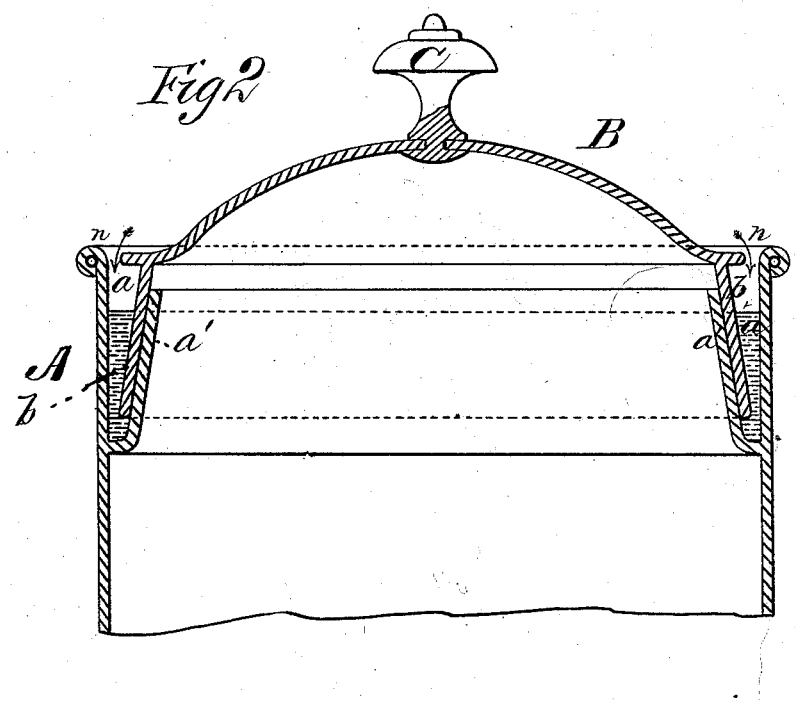
WITNESSES
Villette Anderson.
Francis J. Classi
INVENTOR
James C. Moore,
by E. W. Anderson,
ATTORNEY

UNITED STATES PATENT OFFICE.

JAMES C. MOORE, OF PHILADELPHIA, PENNSYLVANIA.

IMPROVEMENT IN ODORLESS GARBAGE-RECEIVERS.

Specification forming part of Letters Patent No. 199,734, dated January 29, 1878; application filed November 11, 1876.

*To all whom it may concern:*

Be it known that I, JAMES C. MOORE, of Philadelphia, in the county of Philadelphia and State of Pennsylvania, have invented a new and valuable Improvement in Odorless Garbage-Receivers; and I do hereby declare that the following is a full, clear, and exact description of the construction and operation of the same, reference being had to the annexed drawings, making a part of this specification, and to the letters and figures of reference marked thereon.

This invention has relation to improvements in vessels for holding garbage, slops, and the like, wherein a water-seal is used for preventing the escape of offensive odors therefrom.

The object of the invention is mainly to provide a double seal for this purpose, and the additional purpose of preventing the lid or cover from being casually displaced.

To this end the nature of the invention consists in combining with a lid having an outwardly-flaring holding-flange a vessel having a water-seal trough, the inner wall of which converges gradually, and conforms to the divergence of the holding-flange, whereby the lid will be made to form an additional seal to the water-seal and the casual detachment of the same will be prevented, all as will be hereinafter fully explained.

In the annexed drawings, the letter A designates an ordinary cylindrical vessel, having at its upper edge an interior trough, $a$, designed to receive the water which forms the seal. The inner wall $a'$ of the trough $a$ is of the form of a conical frustum—that is, the diameter of the upper edge is less than the lower, and the said trough is wider at top than at the bottom.

B represents a lid, which is preferably of metal, and will be provided with a flaring binding or holding flange, $b$. This flange will also be of the form of a conical frustum, and its upper and lower diameters will be slightly longer than the corresponding parts of the inner wall $a'$ of the water-seal trough $a$, so that, when the lid is applied to the vessel with its holding-flange $b$ in the water-trough, the said flange will bind upon the inner wall $a'$ above described, and any casual displacement of the lid will be effectually prevented.

The binding action of the flange $b$ upon the inner wall of the trough being forcible, their adjacent surfaces will conform accurately the one to the other. The effect of this construction is that the lid is incapable of casual detachment during transportation or while being handled; that offensive slops cannot splash over into the water-seal trough, because of the accuracy with which the lid-flange $b$ binds against and conforms to the wall $a'$ aforesaid; and that the water, being uncontaminated, cannot emit effluvia to the surrounding air. Where the vessel is kept near residences, as in large cities, these advantages will commend themselves to all parties using the vessel constructed as above described, and especially when the vessel is kept indoors.

The lid L of my improved garbage-vessel is of less diameter than the vessel proper. Consequently, when the receptacle is full and the lid applied, the water for the seal may be poured upon the top of the lid, whence it will flow between its perimeter and the walls of the vessel into the trough $a$ through the spaces indicated by the arrows in the drawings. This space is indicated by the letter $n$.

I hereby disclaim the references shown in (Brevets d'Invention) Old. Ser. Vol. 34, Plate 12, of Mr. Quenton Durand; but What I do claim is—

As an article of manufacture, the portable garbage-vessel herein described, consisting of a cylindrical body, having around its mouth an annular inside flange, forming a water-seal trough, and a convex lid, B, of less diameter than said mouth, to provide a channel or passage, $n$, between the margin thereof and the edge of said lid, and having a flange, $b$, extending down into said trough and binding upon its inner wall, constructed and arranged substantially as specified.

In testimony that I claim the above I have hereunto subscribed my name in the presence of two witnesses.

JAMES C. MOORE.

Witnesses:
 CHAS. F. VAN HORN,
 ALLEN H. GANGEWER.